June 5, 1945.   B. TENENBAUM   2,377,827
PIEZOELECTRIC CRYSTAL
Filed March 28, 1944
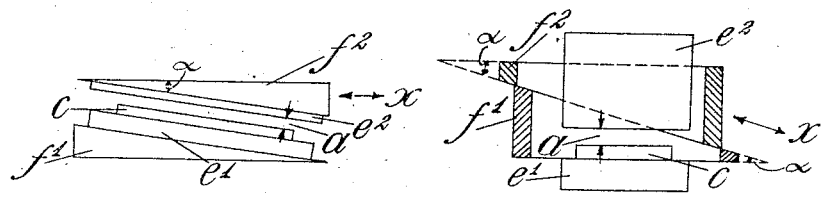
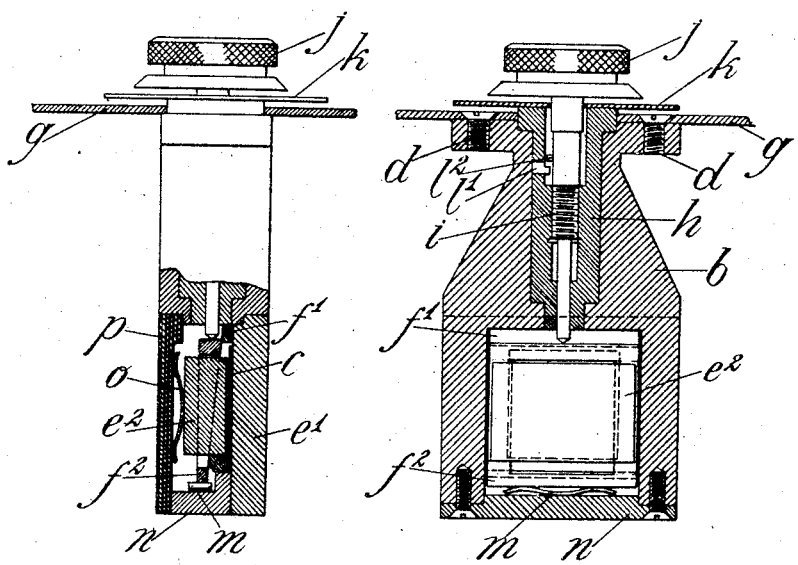
Inventor
B. Tenenbaum Patented June 5, 1945

2,377,827

UNITED STATES PATENT OFFICE 2,377,827

PIEZOELECTRIC CRYSTAL

Berko Tenenbaum, London, England

Application March 28, 1944, Serial No. 528,439
In Great Britain November 11, 1942

3 Claims. (Cl. 171—327)

This invention relates to an improved mounting of piezo-electric crystal.

It is known to vary the frequency of a piezo-electric crystal to a certain extent by varying the distance between the surface of the crystal and an electrode facing it and various methods of mounting have been proposed with this purpose in view.

The object of the invention is to provide a construction which will enable its frequency to be varied more finely than has been possible with the constructions hitherto proposed, and keep it stabilised to the extent of less than $1/1000000$.

The present invention consists in a mounting of piezo-electric crystal in which the distance between the surface of the crystal and the electrode facing it is varied by a straight line sliding movement between the two members respectively carrying the crystal and the electrode facing it, the said straight line forming a small angle with the opposing parallel surfaces of the crystal and of the electrode facing it.

In the accompanying drawing which illustrates, by way of example, two methods of carrying the invention into effect, Figures 1 and 2 show diagrammatically the principles of these two methods, whilst Figures 3 and 4 show respectively in sectional elevation and side view, partly in secton, one embodiment of the invention according to the second method.

Referring to Figure 1 illustrating the first method, two wedge-shaped supporting frames $f_1 f_2$ of insulating material are arranged in opposition to each other in such a manner that their opposing surfaces are parallel to each other, and one of them $f_2$ is adapted to slide relatively to the other one $f_1$, in a direction $x$ at a small angle $\alpha$ with respect to their opposing parallel surfaces. On the latter surfaces, the wedge-shaped member $f_1$ carries the electrode $e_1$ and thereon the crystal $c$, whilst the sliding wedge-shaped member $f_2$ carries the electrode $e_2$, the facing surfaces of the latter and of the crystal being and remaining parallel to each other when they are approaching or are being removed from each other during the relative sliding movement.

Referring to Figure 2 illustrating the second method, the two wedge-shaped frames $f_1 f_2$ are arranged with their parallel opposing surfaces in contact with each other and one of them $f_2$ is adapted to slide along the other $f_1$ in the direction $x$, always remaining in contact with it. As in the arrangement according to Figure 1, the supporting frame $f_1$ carries the electrode $e_1$ and crystal $c$, and the supporting frame $f_2$ the electrode $e_2$, but in this case the opposing surfaces of the electrode $e_2$ and crystal $c$ are no longer parallel to the inclined surfaces of the wedge-shaped supporting frames but only parallel to each other. However, as in the arrangement according to the first method, the variation of the distance $a$ between the parallel surfaces of electrode $e_2$ and crystal $c$ is dependent upon the small angle $\alpha$, which the direction of displacement of the wedge-shaped member $f_2$, viz., its inclined sliding surface, forms with the said parallel surfaces.

For the sake of clearness the angle $\alpha$ is shown exaggerated in the drawing. In reality, it is less than 10°.

By the use of either of the arrangements above referred to it is possible to effect and stabilise an air gap variation up to about $5/100$ of a micron, corresponding to a frequency variation of about $1/5000000$.

Referring to Figures 3 and 4 illustrating, by way of example, one practical form for carrying the invention into effect according to the second arrangement above referred to, $b$ is a housing of aluminium secured by screws $d$ to the wall $g$ of the apparatus in which the crystal is incorporated; $h$ is a brass bushing in which the spindle $i$ is mounted in screw-threaded engagement in order to be displaced axially when operated by the knob $j$; $k$ is a dial and $l_1 l_2$ are two abutments secured to the brass bushing $h$ and the spindle $i$ respectively, to limit the extent of rotation of the spindle and thereby its axial displacement.

The stationary wedge-shaped frame $f_1$ is secured to a separate aluminium plate $e_1$ to which the quartz plate $c$ is attached and which forms the one electrode, the latter forming part of the housing and being thereby connected to the mass of the apparatus. The movable wedge-shaped frame $f_2$ carries the electrode $e_2$, being operated in one direction by the axial displacement of the spindle $i$ against the action of a recoiling spring $m$, mounted on the end piece $n$ of the housing. By means of a spring $o$ which is secured to an insulating plate $p$ forming part of the housing, and presses against the electrode $e_2$ fixed in the frame $f_2$, the latter is constantly kept in sliding contact with the frame $f_1$.

In order to obtain a gradual variation of frequency without air-gap resonance use is preferably made of a Y-cut crystal; alternatively the device may be evacuated or be filled with a gas, for instance hydrogen.

The details for carrying the invention into effect may be modified without departing from the scope of the invention.

I claim:

1. A piezo-electric crystal mounting comprising a piezo-electric crystal, an electrode in contact with the said crystal, a member carrying the said crystal and electrode, a second electrode arranged at a distance from the said crystal so that their opposing surfaces are parallel to each other, a member carrying the second electrode, and means for slidingly guiding and displacing the one carrying member relatively to the other carrying member along a straight line forming a small angle with the opposing parallel surfaces of the crystal and the electrode facing it, whereby the distance between the said parallel surfaces is varied.

2. A piezo-electric crystal mounting as claimed in claim 1, in which the two carrying members are wedge-shaped frames of insulating material arranged in opposition to each other, the opposing parallel surfaces of the crystal and electrode being parallel to the inclined surfaces of the wedge-shaped frames.

3. A piezo-electric crystal mounting as claimed in claim 1, in which the two carrying members are wedge-shaped frames of insulating material arranged in opposition to and in sliding contact with each other, the opposing parallel surfaces of the crystal and electrode forming a small angle with the sliding contact surfaces of the wedge-shaped frames.

BERKO TENENBAUM.